(12) United States Patent
Bandyopadhyay

(10) Patent No.: US 9,624,881 B2
(45) Date of Patent: Apr. 18, 2017

(54) AIRBOX FOR ENGINE

(71) Applicant: Electro-Motive Diesel, Inc., LaGrange, IL (US)

(72) Inventor: Deep Bandyopadhyay, Naperville, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 114 days.

(21) Appl. No.: 14/519,198

(22) Filed: Oct. 21, 2014

(65) Prior Publication Data

US 2016/0108867 A1    Apr. 21, 2016

(51) Int. Cl.
| | |
|---|---|
| F02M 35/10 | (2006.01) |
| F02B 75/22 | (2006.01) |
| F02M 35/104 | (2006.01) |
| F02M 35/116 | (2006.01) |
| F02F 7/00 | (2006.01) |
| F02B 43/02 | (2006.01) |

(52) U.S. Cl.
CPC ....... *F02M 35/10039* (2013.01); *F02B 43/02* (2013.01); *F02B 75/22* (2013.01); *F02F 7/00* (2013.01); *F02M 35/1042* (2013.01); *F02M 35/10052* (2013.01); *F02M 35/116* (2013.01)

(58) Field of Classification Search
CPC .......... F02B 75/22; F02B 25/26; B60K 13/06; B60K 13/02; F02M 35/10052; F02M 35/10347; F02M 35/116; F02F 2200/06; F02F 7/0031
USPC ............ 123/184.21, 184.34, 184.35, 184.31, 123/193.1, 193.5, 193.3, 193.4, 193.2
See application file for complete search history.

(56) References Cited

U.S. PATENT DOCUMENTS

| | | | | |
|---|---|---|---|---|
| 2,371,797 A | * | 3/1945 | Elmer | F02F 7/0014 92/148 |
| 2,371,979 A | * | 3/1945 | Phillips | G01S 1/02 116/246 |
| 3,094,190 A | * | 6/1963 | Hulsing | F01M 9/102 123/195 R |
| 4,569,313 A | | 2/1986 | Nobu | |
| 5,263,440 A | * | 11/1993 | Bodnar | F02B 27/021 123/184.31 |
| 5,373,632 A | * | 12/1994 | Lucier | B23P 6/02 29/402.03 |
| 6,089,199 A | * | 7/2000 | Lohr | F02B 75/22 123/184.21 |
| 6,679,232 B2 | | 1/2004 | Tamamoto et al. | |
| 6,725,822 B2 | | 4/2004 | Matsumoto et al. | |
| 7,981,331 B2 | | 7/2011 | Raab et al. | |
| 8,573,176 B2 | | 11/2013 | Fujii | |

(Continued)

*Primary Examiner* — Long T Tran

(57) ABSTRACT

An airbox for an engine is provided. The airbox includes a first cylinder bank including a plurality of first cylinder sections. The airbox also includes a second cylinder bank including a plurality of second cylinder sections. The airbox further includes an isolation assembly provided in association with the first cylinder bank and the second cylinder bank. The isolation assembly is configured to isolate at least one first cylinder section of the plurality of first cylinder sections from another first cylinder section of the plurality of first cylinder sections, at least one second cylinder section of the plurality of second cylinder sections from another second cylinder section of the plurality of second cylinder sections, and the first cylinder bank from the second cylinder bank.

18 Claims, 4 Drawing Sheets

(56) References Cited

U.S. PATENT DOCUMENTS

| | | |
|---|---|---|
| 8,667,946 B2 | 3/2014 | Mori et al. |
| 2010/0050972 A1* | 3/2010 | Cassinelli ............... F02B 27/02 |
| | | 123/184.56 |
| 2011/0277709 A1* | 11/2011 | Liimatta ............. F02B 29/0462 |
| | | 123/54.4 |
| 2013/0186364 A1* | 7/2013 | Valencia ................... F02F 1/24 |
| | | 123/193.5 |

* cited by examiner

AIRBOX FOR ENGINE

TECHNICAL FIELD

The present disclosure relates to an airbox, and more specifically to an airbox for supplying intake air to an engine.

BACKGROUND

In multi cylinder engines powered by a gaseous fuel, such as, for example, natural gas, the natural gas may be injected into a cylinder port through a gas nozzle prior to the combustion thereof. However, during the operation of the engine, due to sealing limitations between the gas nozzle and the engine, the natural gas may leak into different components of the engine.

For example, the leaked natural gas may flow from one of the cylinders to adjacent cylinders. In another example, the leaked natural gas may flow into an intake air passage and may mix with a flow of intake air therein. As a result, high variation in mass flow and concentration of the natural gas may be present between the different ports of the subsequent cylinders. Generally, maximum loss of natural gas due to leakage may take place at the cylinders located relatively closer to an inlet of the intake air as compared to that of the cylinders located further away from the inlet, due to decrease in velocity along the flow path. The leakage of the natural gas may result in inadequacy and variation in power delivery by the individual cylinders of the engine based on the quantity of loss of the natural gas.

U.S. Pat. No. 6,725,822 describes an intake air dispensing box for an engine. The dispensing box includes a body having an intake air inlet, first and second intake branch pipes and one of halves of a partition wall. The partition wall has an opening provided in its outer wall opposite from the first and second intake branch pipes to extend between first and second dispensing chambers, and a lid detachably coupled to the body to close the opening. The other half of the partition wall includes a valve bore and bearing bores.

SUMMARY OF THE DISCLOSURE

In one aspect of the present disclosure, an airbox for an engine is provided. The airbox includes a first air passage configured to receive intake air. The airbox includes a first cylinder bank including a plurality of first cylinder sections. The first cylinder bank is provided in fluid communication with the first air passage. The airbox includes a second air passage provided laterally spaced apart from the first air passage. The second air passage is configured to receive the intake air. The airbox also includes a second cylinder bank including a plurality of second cylinder sections. The second cylinder bank is provided in fluid communication with the second air passage. The airbox further includes an isolation assembly provided in association with the first cylinder bank and the second cylinder bank. The isolation assembly is configured to isolate at least one first cylinder section of the plurality of first cylinder sections from another first cylinder section of the plurality of first cylinder sections, at least one second cylinder section of the plurality of second cylinder sections from another second cylinder section of the plurality of second cylinder sections, and the first cylinder bank from the second cylinder bank.

In another aspect of the present disclosure, an engine is provided. The engine includes an engine block and an airbox coupled to the engine block. The airbox includes a first air passage configured to receive intake air. The airbox includes a first cylinder bank including a plurality of first cylinder sections. The first cylinder bank is provided in fluid communication with the first air passage. The airbox includes a second air passage provided laterally spaced apart from the first air passage. The second air passage is configured to receive the intake air. The airbox also includes a second cylinder bank including a plurality of second cylinder sections. The second cylinder bank is provided in fluid communication with the second air passage. The airbox further includes an isolation assembly provided in association with the first cylinder bank and the second cylinder bank. The isolation assembly is configured to isolate at least one first cylinder section of the plurality of first cylinder sections from another first cylinder section of the plurality of first cylinder sections, at least one second cylinder section of the plurality of second cylinder sections from another second cylinder section of the plurality of second cylinder sections, and the first cylinder bank from the second cylinder bank.

Other features and aspects of this disclosure will be apparent from the following description and the accompanying drawings.

DETAILED DESCRIPTION

Figure 1:
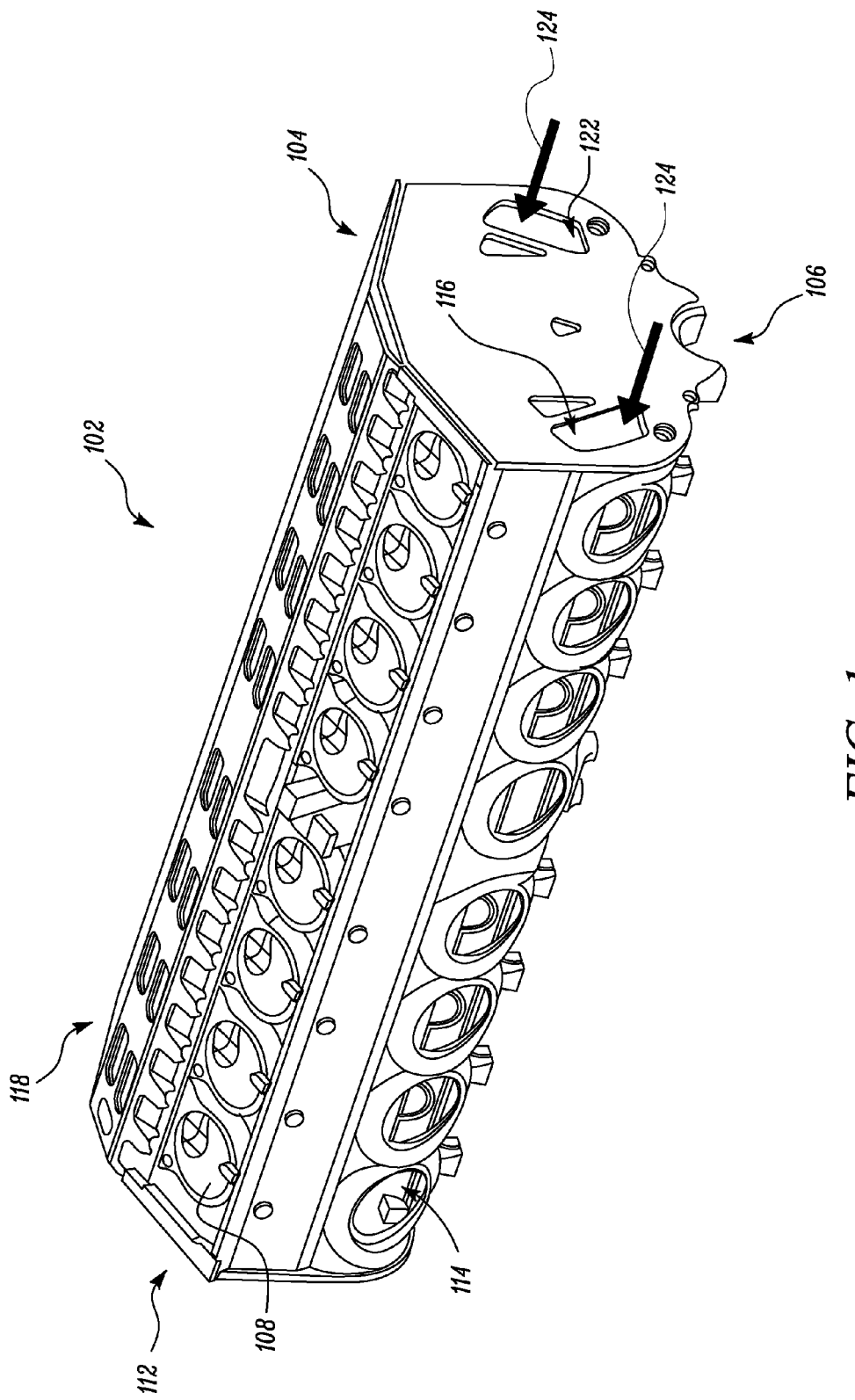
FIG. 1 is a perspective view of an exemplary airbox of an engine, according to an embodiment of the present disclosure.

Wherever possible, the same reference numbers will be used throughout the drawings to refer to the same or the like parts. Referring to FIG. 1, an exemplary airbox 102 of an engine (not shown) is illustrated. In the illustrated embodiment, the airbox 102 is of a V-configuration engine. Alternatively, the configuration of the airbox 102 may include an inline configuration engine, a horizontally opposed configuration engine or a W-configuration engine. The configuration of the airbox 102 disclosed herein is exemplary in nature and may vary as per system design and requirements.

The airbox 102 may be fabricated from one or more components. In such a situation, various components of the airbox 102 may be fastened together by any know fastening methods, such as, but not limited to, welding, bolting, and riveting. Alternatively, the airbox 102 may be cast as a single component. The airbox 102 may be made of any suitable metal or alloy known to one skilled in the art. The airbox 102 includes a cylinder end 104 and a crankshaft end 106. A cylinder head (not shown) may be provided at the cylinder end 104 of the airbox 102. The cylinder end 104 includes a plurality of first cylinders 108 and a plurality of second cylinders 110 (shown in FIG. 2). The plurality of first cylinders 108 and the plurality of second cylinders 110 are spaced apart from one another to form a V-type configuration.

An assembly of the cylinder head and a liner (not shown) is configured to support a piston (not shown) provided within each of the plurality of first cylinders 108 and each of the plurality of second cylinders 110. The piston may be connected to a connecting rod (not shown) by using gudgeon pins (not shown). Further, the connecting rod may be connected to a crankshaft (not shown). The crankshaft end 106 of the airbox 102 is configured to receive and support the crankshaft of the engine.

The airbox 102 includes a first cylinder bank 112. The first cylinder bank 112 has a plurality of first cylinder sections 114. Each of the plurality of first cylinder sections 114 is provided in fluid communication with each of the plurality of first cylinders 108. The airbox 102 also includes a first air passage 116. The first air passage 116 is provided in fluid communication with each of the plurality of first cylinder sections 114. The first air passage 116 is configured to receive intake air from any other component (not shown) of the engine, such as, an air filter, a turbocharger, an aftercooler, and so on. The first air passage 116 is further configured to supply the received intake air to each of the plurality of first cylinder sections 114 and each of the plurality of first cylinders 108.

The airbox 102 includes a second cylinder bank 118. The second cylinder bank 118 is positioned laterally spaced apart from the first cylinder bank 112 in the V-type engine configuration. The second cylinder bank 118 has a plurality of second cylinder sections 120 (shown in FIG. 2). Each of the plurality of second cylinder sections 120 is provided in fluid communication with each of the plurality of second cylinders 110. The airbox 102 also includes a second air passage 122. The second air passage 122 is provided laterally spaced apart from the first air passage 116. The second air passage 122 is provided in fluid communication with each of the plurality of second cylinder sections 120. The second air passage 122 is configured to receive the intake air from any other component (not shown) of the engine, such as, the air filter, the turbocharger, the aftercooler, and so on. The second air passage 122 is further configured to supply the received intake air to each of the plurality of second cylinder sections 120 and each of the plurality of second cylinders 110.

Figure 2:
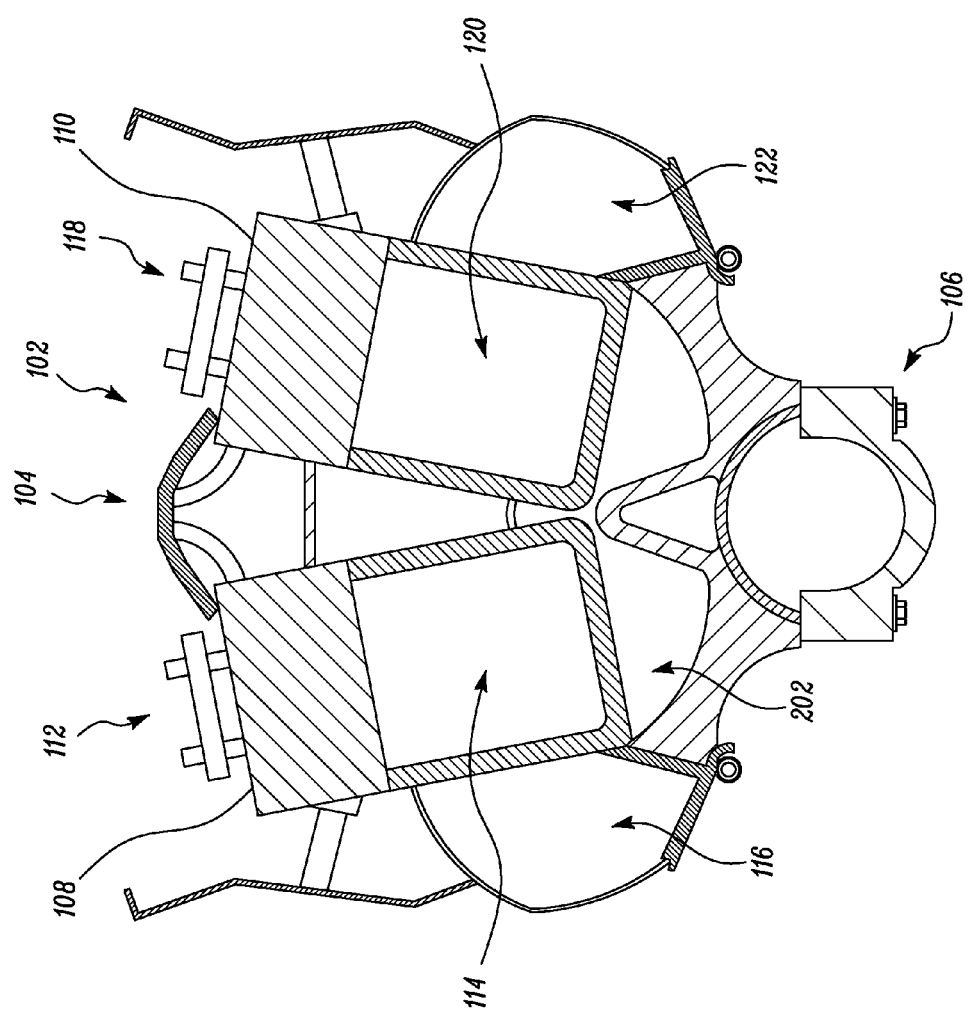
FIG. 2 is a cross sectional view of the airbox of FIG. 1, according to an embodiment of the present disclosure.

Additionally, the airbox 102 includes a gas nozzle (not shown) provided in each of the plurality of first cylinder sections 114 and each of the plurality of second cylinder sections 120. The gas nozzle is configured to inject a fuel, such as, natural gas into each of the plurality of first cylinders 108 and each of the plurality of second cylinders 110 for combustion thereof. Further, the airbox 102 includes an isolation assembly 202. Referring to FIG. 2, a cross sectional view of the airbox 102 is illustrated. The isolation assembly 202 is provided in association with the first cylinder bank 112 and the second cylinder bank 118. The isolation assembly 202 will now be explained in detail with reference to FIGS. 3 and 4.

Figure 3:
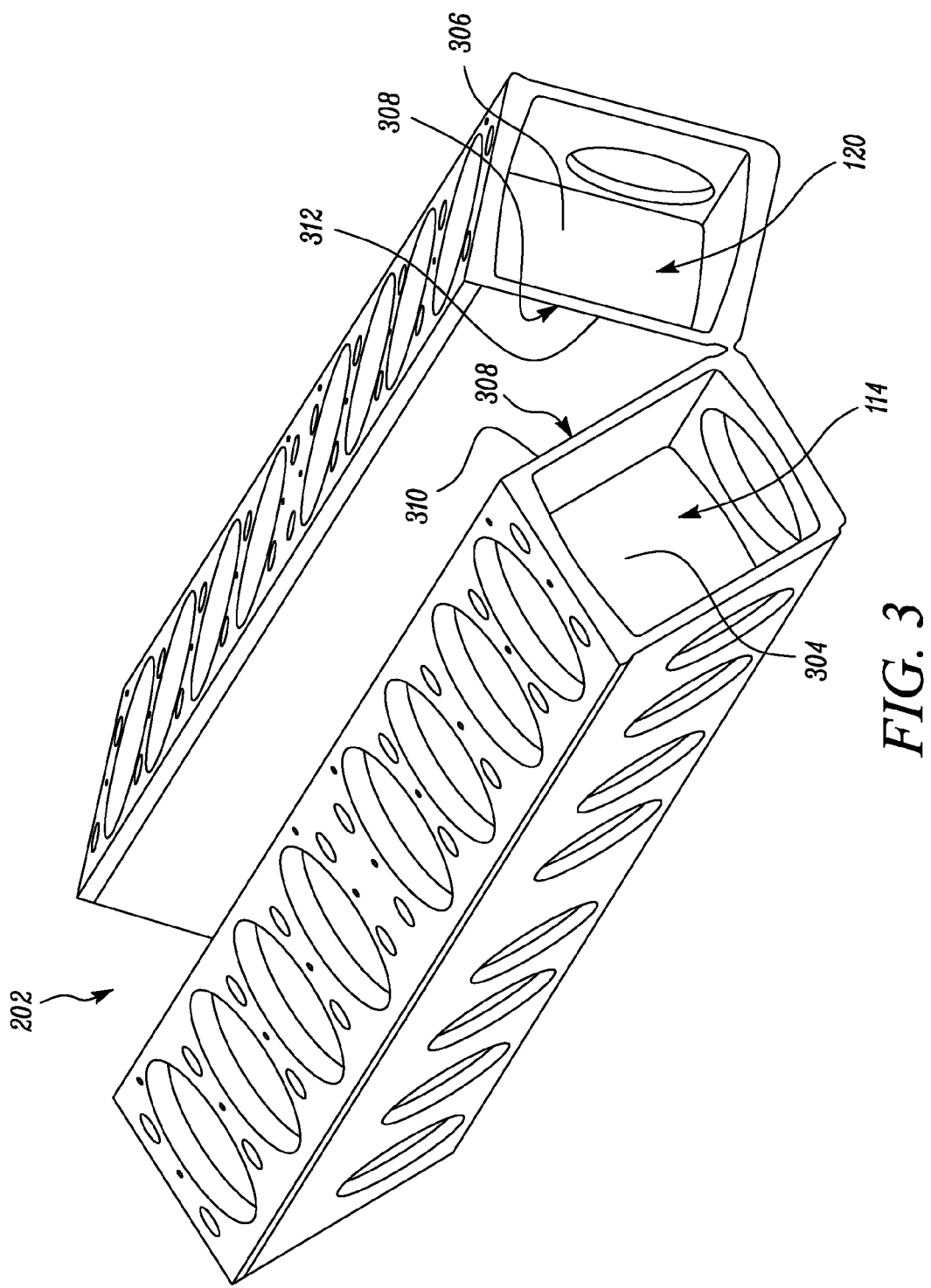
FIG. 3 is a perspective view of an isolation assembly of the airbox, according to an embodiment of the present disclosure.

Referring to FIG. 3, a perspective view of the isolation assembly 202 is illustrated, according to one embodiment of the present disclosure. The isolation assembly 202 includes a first set of isolation plates 304. Each of the first set of isolation plates 304 is provided between each of the plurality of first cylinder sections 114. In other embodiments, each of the first set of isolation plates 304 may be provided between a group of the plurality of first cylinder sections 114. In the illustrated embodiment, each of the first set of isolation plates 304 is provided perpendicular to a flow of the intake air as shown by an arrow 124. Alternatively, each of the first set of isolation plates 304 may be provided inclined to the flow of the intake air. Each of the first set of isolation plates 304 is configured to isolate at least one first cylinder section 114 of the plurality of first cylinder sections 114 from another first cylinder section 114 of the plurality of first cylinder sections 114, in order to control a passage of the received intake air from one first cylinder section 114 to another. More specifically, each of the first set of isolation plates 304 is configured to block any opening present between each of the plurality of first cylinder sections 114 and, thus, block fluid communication therebetween.

Each of the first set of isolation plates 304 has a planar configuration. Each of the first set of isolation plates 304 is rectangular in shape. In other embodiments, each of the first set of isolation plates 304 may have any other shape such as circular, oval, trapezoidal, and so on, based on a shape of a cross section of the plurality of first cylinder sections 114. Each of the first set of isolation plates 304 is provided spaced apart from one another in a series arrangement. Each of the first set of isolation plates 304 separate each of the plurality of first cylinder sections 114 from one another, such that one nozzle is confined to each of the plurality of first cylinder sections 114 and a mixture of the intake air and injected fuel may be confined in the respective first cylinder section 114.

Additionally, the isolation assembly 202 includes a second set of isolation plates 306. Each of the second set of isolation plates 306 is provided between each of the plurality of second cylinder sections 120. In other embodiments, each of the second set of isolation plates 306 may be provided between a group of the plurality of second cylinder sections 120. In the illustrated embodiment, each of the second set of isolation plates 306 is provided perpendicular to the flow of the intake air. Alternatively, each of the second set of isolation plates 306 may be provided inclined to the flow of the intake air. Each of the second set of isolation plates 306 is configured to isolate at least one second cylinder section 120 of the plurality of second cylinder sections 120 from another second cylinder section 120 of the plurality of second cylinder sections 120, in order to control a passage of the received intake air from one second cylinder section 120 to another. More specifically, each of the second set of isolation plates 306 is configured to block any opening present between each of the plurality of second cylinder sections 120 and, thus, block fluid communication therebetween.

Each of the second set of isolation plates 306 has a planar configuration. Each of the second set of isolation plates 306 is rectangular in shape. In other embodiments, each of the second set of isolation plates 306 may have any other shape such as circular, oval, trapezoidal, and so on, based on a shape of a cross section of the plurality of second cylinder sections 120. Each of the second set of isolation plates 306 is provided spaced apart from one another in a series arrangement. Each of the second set of isolation plates 306 separate each of the plurality of second cylinder sections 120 from one another, such that one nozzle is confined to each of the plurality of second cylinder sections 120 and the mixture of the intake air and injected fuel may be confined in the respective second cylinder section 120.

Further, the isolation assembly 202 includes a divider plate 308 provided between the first cylinder bank 112 and the second cylinder bank 118. More specifically, the isolation assembly 202 includes the divider plate 308 formed by a sidewall of at least one of the first cylinder bank 112 and the second cylinder bank 118. In one embodiment, a first sidewall 310 of the first cylinder bank 112 may be configured as the divider plate 308. In such a situation, any openings provided in the first sidewall 310 may be blocked in order to isolate the first cylinder bank 112 from the second cylinder bank 118. Additionally or optionally, in another embodiment, a second sidewall 312 may be configured as the divider plate 308. In such a situation, any openings provided in the second sidewall 312 may be blocked in order to isolate the second cylinder bank 118 from the first cylinder bank 112.

Figure 4:
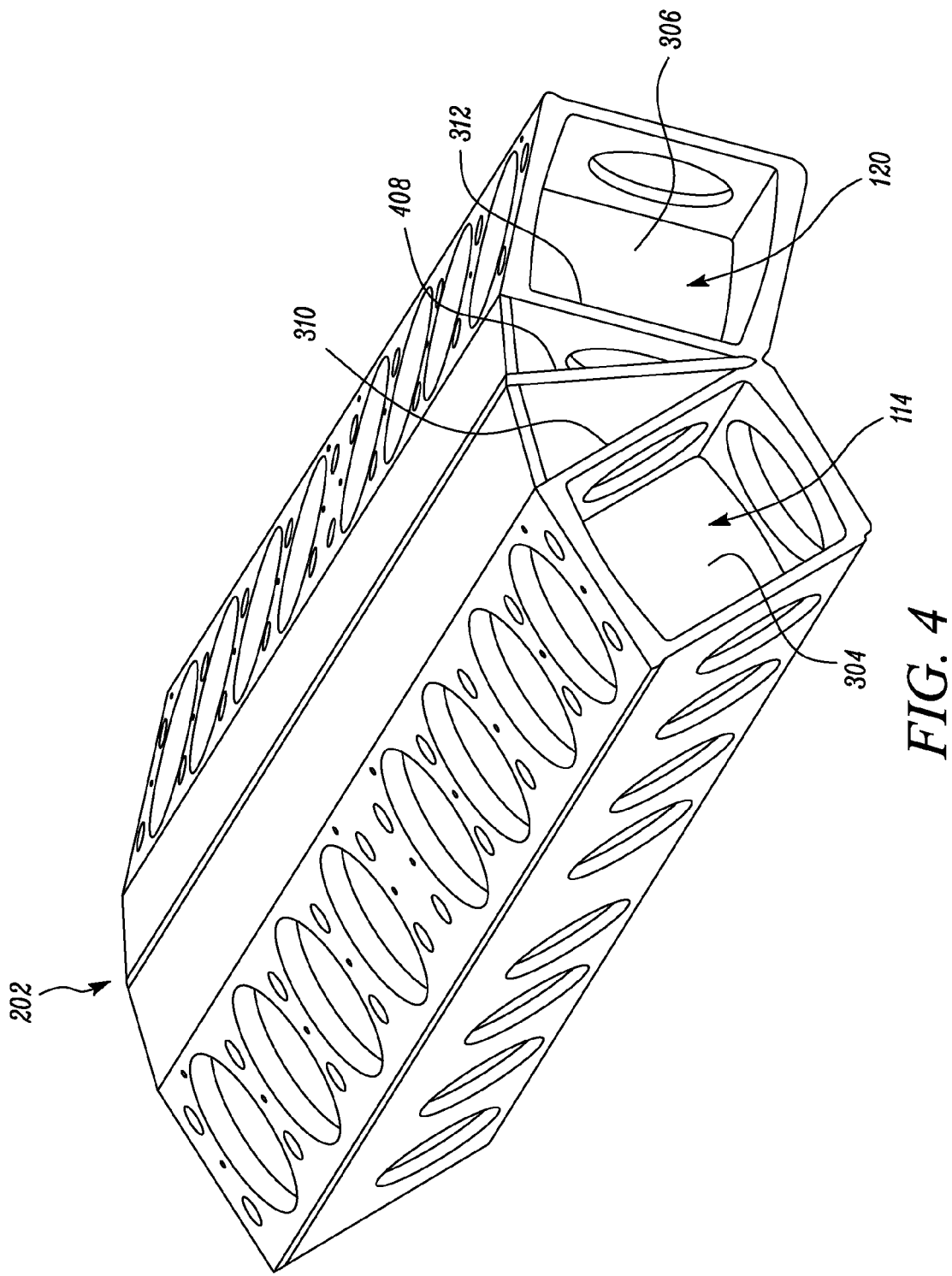
FIG. 4 is a perspective view of the isolation assembly of the airbox, according to another embodiment of the present disclosure.

Referring to FIG. 4, a perspective view of another embodiment of the isolation assembly 202 is illustrated. The divider plate 408 is a separate component positioned between the first cylinder bank 112 and the second cylinder bank 118. The divider plate 408 is positioned vertically and substantially parallel along a length of the first air passage 116 and/or the second air passage 122. In such a situation, each of the first set of isolation plates 304 and each of the second set of isolation plates 306 extend up to the divider plate 408. The divider plate 408 is configured to isolate the first cylinder bank 112 and the second cylinder bank 118 from one another, in order to control a passage of the received intake air therebetween. More specifically, the divider plate 408 is configured to block fluid communication between the first cylinder bank 112 and the second cylinder bank 118. Further in other embodiments (not shown), the isolation assembly 202 may include both the divider plate 408 as the unitary component and the divider plate 308 formed by the first sidewall 310 and/or the second sidewall 312 of at least one of the first cylinder bank 112 and the second cylinder bank 118. The divider plate 308, 408 is configured to isolate the first cylinder bank 112 from the second cylinder bank 118.

The divider plate 308, 408 has a planar configuration. The divider plate 308, 408 is rectangular in shape. In other embodiments, the divider plate 308, 408 may have any other shape such as trapezoidal and so on, based on system design and configuration. A length of the divider plate 308, 408 may be approximately equal or greater than a length of the first cylinder bank 112 and/or the second cylinder bank 118. The divider plate 308, 408 separates the first cylinder bank 112 from the second cylinder bank 118 and in cooperation with each of the first set of isolation plates 304 and each of the second set of isolation plates 306 confines one nozzle to each of the plurality of first cylinder sections 114 and each of the plurality of second cylinder sections 120 respectively. As a result, the mixture of the intake air and the injected fuel may be confined in the respective first cylinder section 114 and the second cylinder section 120.

The isolation assembly 202 may be coupled to the airbox 102 by any known methods of fastening such as, bolting, riveting, welding, and so on. In some embodiments, the isolation assembly 202 may be integrally cast with the airbox 102 during manufacturing thereof. The isolation assembly 202 may be made of any metal, alloy, polymer or a combination thereof.

INDUSTRIAL APPLICABILITY

The present disclosure relates to the isolation assembly 202 for the airbox 102 associated with the engine. During operation of the engine, the intake air is received in each of the plurality of first cylinder sections 114 from the first air passage 116. The first set of isolation plates 304 isolate the received intake air from flowing between each of the plurality of first cylinder sections 114. Additionally, during operation of the engine, the intake air is received in each of the plurality of second cylinder sections 120 from the second air passage 122. The second set of isolation plates 306 isolate the received intake air from flowing between each of the plurality of second cylinder sections 120.

Further, the divider plate 308, 408 provides isolation between the first cylinder bank 112 and the second cylinder bank 118 and isolates flowing of the received intake air therebetween. As a result, flowing out the intake air received in each of the plurality of first cylinder sections 114 and each of the plurality of second cylinder sections 120 is controlled. Further, due to a velocity and pressure of the intake air flowing in the first air passage 116 and the second air passage 122, the intake air received in each of the plurality of first cylinder sections 114 and each of the plurality of second cylinder sections 120 may be prevented from flowing back into the first air passage 116 and the second air passage 122 respectively.

As a result, the mixture of the intake air and the injected fuel present in each of the first cylinder sections 114 and each of the plurality of second cylinder sections 120 during operation of the engine may be contained therein and controlled from flowing therebeween and back into the first air passage 116 and the second air passage 122 respectively. Additionally, as the mixture of the intake air and the injected fuel may be contained within the respective first cylinder sections 114 and the second cylinder sections 120, mass flow and concentration of the fuel may be consistently maintained across each of the plurality of first cylinder sections 114 and each of the plurality of second cylinder sections 120.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An airbox for an engine, the airbox comprising:
   a first air passage configured to receive intake air;
   a first cylinder bank including a plurality of first cylinder sections, the first cylinder bank provided in fluid communication with the first air passage;
   a second air passage provided laterally spaced apart from the first air passage, the second air passage configured to receive the intake air;
   a second cylinder bank including a plurality of second cylinder sections, the second cylinder bank provided in fluid communication with the second air passage; and
   an isolation assembly provided in association with the first cylinder bank and the second cylinder bank, the isolation assembly comprising:
      a first isolation plate configured to isolate at least one first cylinder section of the plurality of first cylinder sections from another first cylinder section of the plurality of first cylinder sections;
      a second isolation plate configured to isolate at least one second cylinder section of the plurality of second cylinder sections from another second cylinder section of the plurality of second cylinder sections; and
      the first cylinder bank from the second cylinder bank.

2. The airbox of claim 1, wherein the isolation assembly includes a first set of isolation plates, each of the first set of isolation plates provided between each of the plurality of first cylinder sections.

3. The airbox of claim 2, wherein the isolation assembly further includes a second set of isolation plates, each of the second set of isolation plates provided between each of the plurality of second cylinder sections.

4. The airbox of claim 1, wherein the isolation assembly includes a divider plate provided between the first cylinder bank and the second cylinder bank.

5. The airbox of claim 4, wherein the divider plate is a unitary component.

6. The airbox of claim 4, wherein the divider plate is formed by a sidewall of at least one of the first cylinder bank and the second cylinder bank such that the divider plate is configured to isolate the first cylinder bank from the second cylinder bank.

7. The airbox of claim 1, wherein the isolation assembly is coupled to the airbox using at least one of welding, bolting, and riveting.

8. The airbox of claim 1, wherein the isolation assembly is integrally cast with the airbox.

9. The airbox of claim 1, wherein the isolation assembly is made of at least one of a metal and a polymer.

10. An engine comprising:
   an engine block; and
   an airbox coupled to the engine block, the airbox comprising:
      a first air passage configured to receive intake air;
      a first cylinder bank including a plurality of first cylinder sections, the first cylinder bank provided in fluid communication with the first air passage;
      a second air passage provided laterally spaced apart from the first air passage, the second air passage configured to receive the intake air;
      a second cylinder bank including a plurality of second cylinder sections, the second cylinder bank provided in fluid communication with the second air passage; and
      an isolation assembly provided in association with the first cylinder bank and the second cylinder bank, the isolation assembly comprising:
         a first isolation plate configured to isolate at least one first cylinder section of the plurality of first cylinder sections from another first cylinder section of the plurality of first cylinder sections;
         a second isolation plate configured to isolate at least one second cylinder section of the plurality of second cylinder sections from another second cylinder section of the plurality of second cylinder sections; and
         the first cylinder bank from the second cylinder bank.

11. The engine of claim 10, wherein the isolation assembly includes a first set of isolation plates, each of the first set of isolation plates provided between each of the plurality of first cylinder sections.

12. The engine of claim 11, wherein the isolation assembly further includes a second set of isolation plates, each of the second set of isolation plates provided between each of the plurality of second cylinder sections.

13. The engine of claim 10, wherein the isolation assembly includes a divider plate provided between the first cylinder bank and the second cylinder bank.

14. The engine of claim 13, wherein the divider plate is a unitary component.

15. The engine of claim 13, wherein the divider plate is formed by a sidewall of at least one of the first cylinder bank and the second cylinder bank such that the divider plate is configured to isolate the first cylinder bank from the second cylinder bank.

16. The engine of claim 10, wherein the isolation assembly is coupled to the airbox using at least one of welding, bolting and riveting.

17. The engine of claim 10, wherein the isolation assembly is integrally cast with the airbox.

18. The engine of claim 10, wherein the isolation assembly is made of at least one of a metal and a polymer.

* * * * *